United States Patent
Tirloni et al.

(10) Patent No.: US 6,321,016 B1
(45) Date of Patent: Nov. 20, 2001

(54) OPTICAL FIBER HAVING LOW NON-LINEARITY FOR WDM TRANSMISSION

(75) Inventors: Bartolomeo Italo Tirloni, Scanzorosciate; Francesco Sartori; Davide Sarchi, both of Milan; Giacomo Stefano Roba, Monza, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/335,509

(22) Filed: Jun. 18, 1999

Related U.S. Application Data

(60) Provisional application No. 60/090,791, filed on Jun. 25, 1998.

(30) Foreign Application Priority Data

Jun. 19, 1998 (EP) .................................................. 9811292

(51) Int. Cl.[7] ...................................................... G02B 6/02
(52) U.S. Cl. ........................ 385/127; 385/123; 385/126; 385/124; 359/341
(58) Field of Search ................................... 385/123, 124, 385/126, 127, 128; 359/341, 345

(56) References Cited

U.S. PATENT DOCUMENTS

| | | |
|---|---|---|
| 4,690,504 | 9/1987 | Yokokawa et al. . |
| 4,715,679 | 12/1987 | Bhagavatula . |
| 4,877,304 | 10/1989 | Bhagavatula . |
| 4,889,404 | 12/1989 | Bhagavatula et al. . |
| 5,555,340 | 9/1996 | Onishi et al. . |
| 5,579,428 | 11/1996 | Evans et al. . |
| 5,684,909 | 11/1997 | Liu . |
| 5,963,700 | * 10/1999 | Kato et al. ............................ 385/127 |
| 6,025,954 | * 2/2000 | Meli et al. ............................ 359/341 |
| 6,192,179 | * 2/2001 | Berkey et al. ........................ 385/126 |

FOREIGN PATENT DOCUMENTS

| | | |
|---|---|---|
| 0 724 171 | 7/1996 | (EP) . |
| 0 789 255 | 8/1997 | (EP) . |
| 0 798 578 | 10/1997 | (EP) . |

OTHER PUBLICATIONS

Y. Kodama et al., "Nonlinear Pulse Propagation in a Mono-mode Dielectric Guide", IEEE Jouranal of Quantum Electronics, vol. QE–23, No. 5, pp. 510–524, (1987).

F.M. Knox et al., "Soliton Transmission at 10 Gbit/s Over 2022 km of Standard Fibre with Dispersion Compensation", 22nd European Conference on Optical Communication, pp. 3. 101–3. 104, (1996).

* cited by examiner

*Primary Examiner*—Rodney Bovernick
*Assistant Examiner*—Sung Pak
(74) *Attorney, Agent, or Firm*—Finnegan, Henderson, Farabow, Garrett & Dunner, L.L.P.

(57) ABSTRACT

An optical transmission fiber has a refractive index profile with an area of increased index of refraction at the inner core of the fiber, an annular region positioned radially outward from the inner core with an index of refraction exceeding the index of the inner core, and at least a low dopant content region in a cross-sectional region between the inner core and the annular region. A low loss cladding layer surrounds the core region. The optical transmission fiber with this segmented core profile provides a high effective area, low non-linearity coefficient, nonzero dispersion, and relatively flat dispersion slope.

28 Claims, 11 Drawing Sheets

OPTICAL FIBER HAVING LOW NON-LINEARITY FOR WDM TRANSMISSION

Under provisions of 35 U.S.C. §119(e), the applicants claim the benefit of U.S. provisional application No. 60/090,791, filed Jun. 25, 1998, which is incorporated herein by reference.

BACKGROUND OF THE INVENTION

The present invention relates generally to an optical transmission fiber that has improved characteristics for minimizing non-linear effects, and specifically to an optical fiber for use in a wavelength-division-multiplexing (WDM) system that has two refractive index peaks with the maximum index of refraction difference located in an outer core region.

In optical communication systems, non-linear optical effects are known to degrade the quality of transmission along standard transmission optical fiber in certain circumstances. These non-linear effects, which include four-wave mixing (FWM), self-phase modulation (SPM), cross-phase modulation (XPM), modulation instability (MI), stimulated Brillouin scattering (SBS) and stimulated Raman scattering (SRS), particularly cause distortion in high power systems. The strength of non-linear effects acting on pulse propagation in optical fibers is linked to the product of the non-linearity coefficient $\gamma$ and the power P. The definition of the non-linearity coefficient, as given in the paper "Nonlinear pulse propagation in a monomode dielectric guide" by Y. Kodama et al., IEEE Journal of Quantum Electronics, vol. QE-23, No. 5, 1987, is the following:

$$\gamma = \frac{1}{\lambda n_{\mathit{eff}}} \frac{\int_0^\infty n(r) n_2(r) |F(r)|^4 r dr}{[\int_0^\infty |F(r)|^2 r dr]^2} \tag{1}$$

where r is the radial coordinate of the fiber, $n_{\mathit{eff}}$ is the effective mode refractive index, $\lambda$ is a signal wavelength, n(r) is the refractive index radial distribution, $n_2(r)$ is the non-linear index coefficient radial distribution, and F(r) is the fundamental mode radial distribution.

Applicants have identified that equation (1) takes into account the radial dependence of the non-linear index coefficient $n_2$ which is due to the varying concentration of the fiber dopants used to raise (or to lower) the refractive index with respect to that of pure silica.

If we neglect the radial dependence of the non-linear index coefficient $n_2$ we obtain a commonly used expression for the coefficient $\gamma$.

$$\gamma = \frac{2\pi n_2}{\lambda A_{\mathit{eff}}} \tag{2}$$

where we have introduced the so called effective core area, or briefly, effective area, $$A_{\mathit{eff}} = \frac{2\pi \left[\int_0^\infty |F(r)|^2 r dr\right]^2}{\int_0^\infty |F(r)|^4 r dr}. \tag{3}$$

The approximation (2), in contrast to the definition (1) does not distinguish between refractive index radial profiles that have the same effective core area $A_{\mathit{eff}}$ value but different $\gamma$ values. While $1/A_{\mathit{eff}}$ is often used as a measure of the strength of non-linear effects in a transmission fiber, $\gamma$ as defined by equation (1) actually provides a better measure of the strength of those effects.

Group velocity dispersion also provides a limitation to quality transmission of optical signals across long distances. Group velocity dispersion broadens an optical pulse during its transmission across long distances, which may lead to dispersion of the optical energy outside a time slot assigned for the pulse. Although dispersion of an optical pulse can be somewhat avoided by decreasing the spacing between regenerators in a transmission system, this approach is costly and does not allow one to exploit the advantages of repeaterless optical amplification.

One known way of counteracting dispersion is by adding suitable dispersion compensating devices, such as gratings or dispersion compensating fibers, to the telecommunication system.

Furthermore, to compensate dispersion, one trend in optical communications is toward the use of soliton pulses, a particular type of RZ (Return-to-Zero) modulation signal, that maintain their pulse width over longer distances by balancing the effects of group velocity dispersion with the non-linear phenomenon of self-phase modulation. The basic relation that governs soliton propagation in a single mode optical fiber is the following:

$$P_0 T_0^2 = \text{cost} \frac{D \lambda^2}{\gamma} \tag{4}$$

where $P_0$ is the peak power of a soliton pulse, $T_0$ is the time duration of the pulse, D is the total dispersion, $\lambda$ is the center wavelength of the soliton signal, and $\gamma$ is the previously introduced fiber non-linearity coefficient. Satisfaction of equation (4) is necessary in order for a pulse to be maintained in a soliton condition during propagation.

A possible problem that arises in the transmission of solitons in accordance with equation (4) is that a conventional optical transmission fiber is lossy, which causes the peak power $P_0$ of the soliton pulse to decrease exponentially along the length of the fiber between optical amplifiers. To compensate for this decrease, one can set the soliton power $P_0$ at its launch point at a value sufficient to compensate for the subsequent decrease in power along the transmission line. An alternative approach, as disclosed for example in F. M. Knox et al., paper WeC.3.2, page 3.101–104, ECOC, '96, Oslo (Norway), is to compensate (with dispersion compensating fiber, although fibre Bragg gratings can also be used) for the dispersion accumulated by the pulses along the stretches of the transmission line where the pulses' peak power is below a soliton propagation condition.

Optical fibers having a low non-linearity coefficient are preferred for use in transmission systems, such as Non-Return-to-Zero (NRZ) optically amplified WDM systems, as well as non amplified systems, to avoid or limit the non-linear effects mentioned above. Furthermore, fibers with a lower non-linearity coefficient allow an increase in the launch power while maintaining non-linear effects at the same level. An increased launch power in turn means a better S/N ratio at the receiver (lower BER) and/or the possibility to reach longer transmission distances by increasing the amplifier spacing. Accordingly, Applicants have addressed a need for optical fibers having low values of non-linearity coefficient $\gamma$.

Also in the case of soliton systems, to increase the spacing between amplifiers one can increase the launch power for the pulses using more powerful amplifiers. In this case, however, equation (4) implies that if the launch power is increased and the soliton pulse duration remains constant, the ratio $D/\lambda^2/\gamma$ must accordingly be increased. Therefore, lower values of non-linear coefficient $\gamma$ are desirable also to provide an increased distance between line amplifiers in a soliton transmission system.

Patents and publications have discussed the design of optical transmission fibers using a segmented core or double-cladding refractive index profile and fibers having a large effective area. For example, U.S. Pat. No. 5,579,428 discloses a single-mode optical fiber designed for use in a WDM soliton telecommunication system using optical lumped or distributed amplifiers. Over a preselected wavelength range, the total dispersion for the disclosed optical fiber lies within a preselected range of positive values high enough to balance self-phase modulation for WDM soliton propagation. As well, the dispersion slope lies within a preselected range of values low enough to prevent collisions between WDM solitons and to reduce their temporal and spectral shifts. The proposed fiber of the '428 patent is a segmented core with a region of maximum index of refraction in the core of the fiber.

U.S. Pat. No. 4,715,679 discloses an optical fiber having a segmented core of a depressed refractive index for making low dispersion, low loss waveguides. The '679 patent discloses a plurality of refractive index profiles including an idealized profile having an area of maximum index of refraction at an annular region outside the inner core of the fiber but inside an outer core annular region.

U.S. Pat. No. 4,877,304 discloses an optical fiber that has a core profile with a maximum refractive index greater than that of its cladding. U.S. Pat. No. 4,889,404 discloses an asymmetrical bidirectional optical communication system including an optical fiber. While the '304 and '404 patents also describe idealized refractive index profiles potentially having an outer annular region with an increased index of refraction, no specific examples corresponding to those profiles are disclosed and the patents are silent as to the non-linear characteristics of optical fibers having those profiles.

U.S. Pat. No. 5,684,909, EP 789,255, and EP 724,171 disclose single mode optical fibers having large effective areas made by a segmented refractive index core profile. This patent and applications describe computer simulations for obtaining fibers with a large effective area for use in long distance, high bit rate optical systems. The '909 patent shows a core profile having two non-adjacent profile segments having a positive index of refraction and two additional non-adjacent segments having a negative index of refraction. The '909 patent aims to achieve a fiber with a substantially zero dispersion slope from the segmented core profile. The fibers disclosed in EP 789,255 have extremely large effective areas achieved by a refractive index profile with a segmented core but having at least two non-adjacent segments with negative refractive difference. EP 724,171 discloses optical fibers with the maximum index of refraction present at the center of the fiber.

U.S. Pat. No. 5,555,340 discloses a dispersion compensating optical fiber having a segmented core for obtaining dispersion compensation. The '340 patent discloses a refractive index profile where a resin film surrounding a cladding has a higher index of refraction than the inner core of the fiber. This resin, however, does not serve as a low-loss light-conductive layer in the fiber structure.

SUMMARY OF THE INVENTION

Applicants have noticed that the distribution of refractive-index-modifying dopants in the fiber cross-section has a significant impact on the fiber non-linearity characteristics. Applicants have determined that the non-linear index $n_2$ contributes to the non-linearity coefficient $\gamma$ with a constant term, due to pure silica and with a radially varying term, proportional to the concentration of index-modifying dopants. Dopants that are added to pure silica glass to increase the refractive index (e.g., $GeO_2$) or to decrease it (e.g., fluorine) both tend to increase the glass non-linearity beyond the non-linearity value of pure silica. Applicants have found that known large-effective-area fibers, while achieving an overall increase in effective area, fail to achieve an optimum decrease in $\gamma$, due to the effect of dopants in areas of the fiber cross-section where the optical field has a relatively high intensity.

Furthermore, Applicants have noticed that refractive-index-modifying-dopants tend to increase fiber loss, in particular due to an increased scattering loss. According to the above, Applicants have afforded the task of developing an optical fiber with a low non-linearity coefficient $\gamma$ and a limited loss.

Applicants have developed an optical fiber having a comparatively low dopant concentration where the optical field intensity is relatively high, and a comparatively higher dopant concentration where the optical field intensity is relatively low.

Applicants have found that a low non-linearity coefficient $\gamma$ can be achieved in an optical fiber by selecting an index profile for the fiber with a first peak in the fiber central cross-sectional area, an outside ring with a second peak value higher than the first peak and at least a low-dopant-content region in a cross-sectional region between the two peaks. In this fiber the optical field intensity outside the inner core region is increased. The presence of a low-dopant-content region in combination with a relatively high field intensity achieves a substantial decrease in the non-linearity coefficient, together with a limited impact on fiber loss.

In one aspect, an optical transmission fiber with a low non-linearity coefficient $\gamma$ and high effective area consistent with the present invention includes a core region and a low loss cladding surrounding the core region. The core region comprises: a glass inner core having a first maximum refractive index difference $\Delta n1$, a profile $\alpha$, and a radius r1; a first glass layer radially surrounding the inner core, having a substantially constant refractive index difference $\Delta n2$ less than $\Delta n1$, and having an outer radius r2; and a second glass layer radially surrounding the first layer, having a second maximum refractive index difference $\Delta n3$ greater than $\Delta n1$, and having a width w at the base, wherein $\gamma$ is less than about $2\ W^{-1}\ km^{-1}$ over a preselected operating wavelength range. The refractive index difference $\Delta n2$ of the first glass layer is lower in absolute value than 10% of said second maximum refractive index difference $\Delta n3$. More preferably $\Delta n2$ is lower in absolute value than 5% of $\Delta n3$. Preferably $\Delta n2$ is substantially constant across the first glass layer.

Preferably the peak index of refraction $\Delta n3$ of second glass layer exceeds the peak index of refraction $\Delta n1$ for inner core by more than 5%.

In a second aspect, an optical transmission fiber with a high effective area and a non-linearity coefficient $\gamma$ lower than about $2\ W^{-1}km^{-1}$ for use in an optical transmission system consistent with the present invention has a core region and a low loss cladding surrounding the core region. The core region includes a glass inner core having a first maximum refractive index difference $\Delta n1$, a profile $\alpha$, and a radius r1; a first glass layer radially surrounding the inner core, having a refractive index difference $\Delta n2$ less than $\Delta n1$, and having an outer radius r2; and a second glass layer radially surrounding the first layer, having a second maximum refractive index difference Δn3 greater than Δn1, and having a width w. Said first glass layer comprises a low-dopant-content region.

In a further aspect, an optical transmission system consistent with the present invention comprises an optical transmitter for outputting an optical signal and an optical transmission line for transmitting said signal. The optical transmission line comprises an optical transmission fiber having a first refractive index peak in the fiber central cross-sectional area, an outside ring with a second refractive index peak value higher than the first peak and a low-dopant-content region between the two peaks.

Preferably said low-dopant-content region has a refractive index difference, in absolute value, of about, or lower than, 15% of the fiber peak refractive index difference, i.e. of the refractive index difference of the outside ring.

In a preferred embodiment, the optical transmission system further comprises a plurality of optical transmitters for outputting a plurality of optical signals, each signal having a particular wavelength, and an optical combiner for combining the optical signals to form a wavelength division multiplexed optical communication signal and outputting the combined signal onto said optical transmission line.

Preferably, said optical transmission fiber has a length greater than 50 km.

Preferably, said optical transmission line comprises at least one optical amplifier.

In a still further aspect, a method consistent with the present invention for controlling non-linear effects in optical fiber transmission comprises the steps of: generating an optical signal; coupling the optical signal in a silica optical fiber having a non-linearity coefficient; doping a central cross-sectional area of the fiber to provide a first refractive index peak; enhancing a field intensity associated with the optical signal in a fiber cross-sectional area outside said central cross-sectional area, by doping an annular glass ring of said fiber to provide a second refractive index peak value, higher than the first peak. The method comprises the step of selecting a dopant concentration of a fiber cross-sectional region between the two peaks below a predetermined value, so as to reduce the fiber non-linearity coefficient.

It is to be understood that both the foregoing general description and the following detailed description are exemplary and explanatory only and are not restrictive of the invention, as claimed. The following description, as well as the practice of the invention, set forth and suggest additional advantages and purposes of this invention.

BRIEF DESCRIPTION OF THE DRAWINGS

The accompanying drawings, which are incorporated in and constitute a part of this specification, illustrate embodiments of the invention, and together with the description, explain the advantages and principles of the invention.

DETAILED DESCRIPTION OF THE PREFERRED EMBODIMENTS

Figure 1:
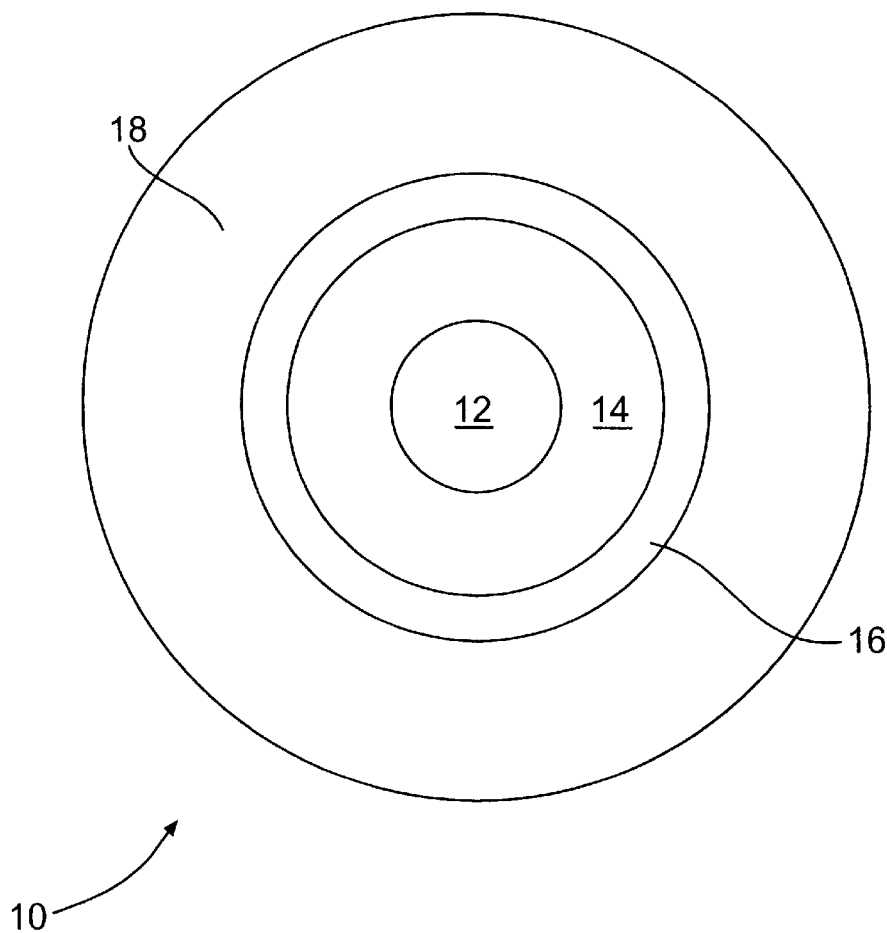
FIG. 1 is a cross-section of an optical transmission fiber consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Optical fibers consistent with the present invention have a refractive index profile that includes two areas of peak refractive index difference in a radial dimension of the fiber, where the greater of the two peaks is positioned radially outward from the first peak. Applicants have discovered that optical fibers having refractive index profiles of this nature can produce optical characteristics in a wavelength operating range of 1520 to 1620 nm that includes a relatively low non-linearity coefficient γ and a relatively high effective area. Due to their characteristics, the invention fibers can be advantageously used, in particular, in long length (e.g., greater than 50 km) optical transmission lines and/or with high power signals (e.g., in optical transmission lines with optical amplifiers). Moreover, Applicants have discovered that optical fibers including this refractive index profile can effectively operate as nonzero dispersion fibers to minimize the non-linear effect of four-wave mixing in WDM systems, both for nonzero positive dispersion and nonzero negative dispersion. Furthermore, Applicants have determined that optical fibers including this refractive index profile can effectively operate as dispersion shifted fibers to minimize the non-linear effects in optical transmission systems.

As generally referenced as 10 in FIG. 1, the optical transmission fiber with a low non-linearity coefficient γ comprises a plurality of light conducting layers of glass with varying indices of refraction. As shown in the cross-section of fiber 10 in FIG. 1, the axial center of the fiber is an inner core 12 that has a first maximum refractive index difference $\Delta n1$ and a radius r1. As readily known to those of ordinary skill in the art, refractive index difference refers to the difference in refractive index between a given layer of glass and the cladding glass. That is, the refractive index difference $\Delta n1$ of inner core 12, having a refractive index n1, equals n1−ncladding. Glass core 12 preferably is made of $SiO_2$ doped with a substance that increases the refractive index of pure $SiO_2$, such as $GeO_2$. Other dopants increasing the refractive index are for example $Al_2O_3$, $P_2O_5$, $TiO_2$, $ZrO_2$ and $Nb_2O_3$.

A first glass layer 14 surrounds the inner core 12 and is characterized by an index of refraction across its width that is less than the indices of refraction along the radius r1 of inner core 12. Preferably, and as discussed in more detail below, first layer 14 is made of pure $SiO_2$ that has a refractive index difference $\Delta n2$ substantially equal to 0.

A second glass layer 16 surrounds the first glass layer 14 along the length of the fiber 10. Second glass layer 16 has a maximum index of refraction $\Delta n3$ within its width that exceeds the maximum index of refraction of the glass $\Delta n1$ within inner core 12. Finally, a low loss cladding 18 surrounds the second glass layer 16 in a conventional manner to help guide light propagating along the axis of fiber 10. Cladding 18 may comprise pure $SiO_2$ glass with a refractive index difference substantially equal to 0. If cladding 18 includes some refractive-index-modifying dopant, the cladding should have an index of refraction across its width that is less than the maximum indices of refraction within both inner core 12 and second layer 16.

Figure 2:
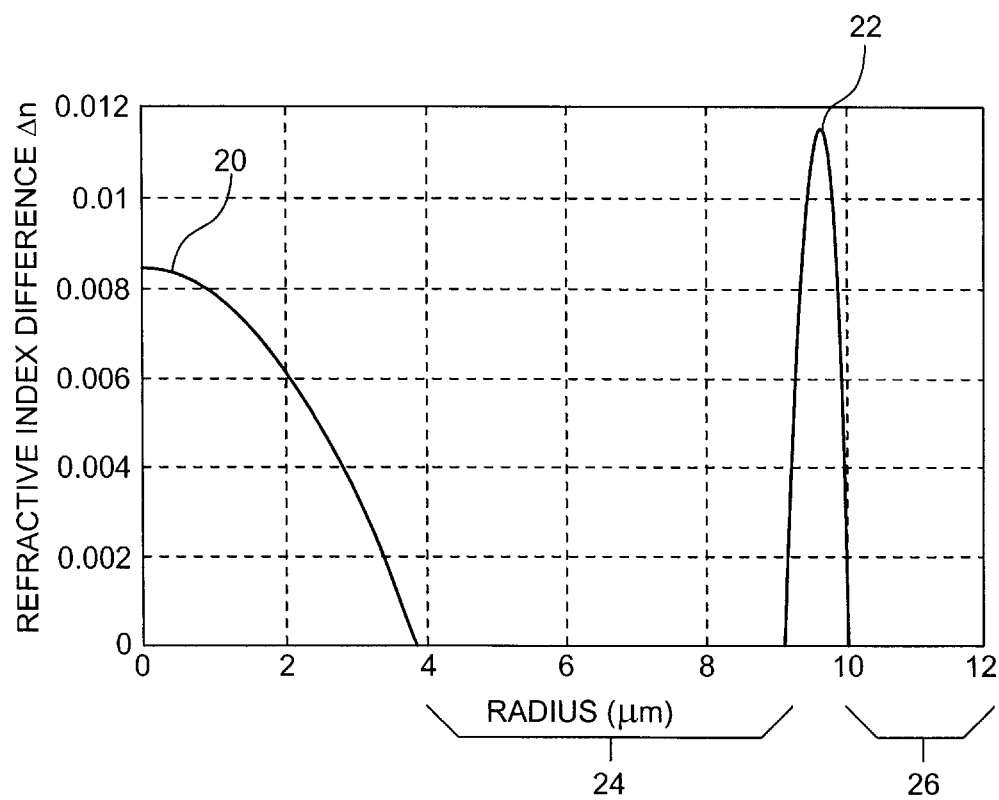
FIG. 2 is a graph of the refractive index profile of the cross-section of the fiber in FIG. 1 consistent with a first embodiment of the present invention.

FIG. 2 illustrates a refractive index profile across the radius of fiber 10 for a first embodiment of the present invention. As generally shown, 10 has two refractive index peaks 20 and 22 positioned respectively within inner core 12 and second layer 16. First layer 14, which is disposed radially between inner core 12 and second layer 16, provides a refractive index dip relative to its two adjacent layers 12 and 16. Consequently, the combination of inner core 12, first layer 14, and second layer 16 generally provides an optical fiber profile having a segmented core with an outer layer having the highest index of refraction within the cross-section of the fiber.

As shown in FIG. 2, according to a first embodiment of the present invention, inner core 12 has a radius r1 that is about 3.6 µm to 4.2 µm, but preferably is about 3.9 µm. Between the center of the fiber and the radial position at 3.9 µm, inner core 12 includes a refractive-index-increasing dopant such as $GeO_2$ or the like that produces a peak index of refraction at or near the axial center of fiber 10 and a minimum for the inner core at its outer radius. At the peak, the refractive index difference for inner core 12 is about 0.0082 to 0.0095, but preferably is about 0.0085. The concentration of the refractive-index-increasing dopant decreases from the center of inner core 12 to the outer radius at about 3.9 µm in a manner to produce a profile having a curved slope that resembles a substantially parabolic shape. The preferred substantially parabolic shape corresponds to a profile α of between about 1.7 and 2.0, but preferably of about 1.9. In general, the profile of inner core 12 is a profile α corresponding to the following:

$$\Delta n = \Delta n_1 \left[1 - \left(\frac{r}{r1}\right)^\alpha\right], r \in [0, r1] \quad (5)$$

As is readily known to one of ordinary skill in the art, the profile α indicates the amount of roundness or curvature to the profile of the core, where α=1 corresponds to a triangular shape for the glass core, and α=2 corresponds to a parabola. As the value of α becomes greater than 2 and approaches 6, the refractive index profile becomes more nearly a step index profile. A true step index is described by an α of infinity, but an α of about 4 to 6 is a step index profile for practical purposes. The profile α may have an index depression, in the shape of an inverted cone, along its centerline, for example if the fiber is produced by the OVD or MCVD methods.

First glass layer 14 has a refractive index difference $\Delta n2$, referenced as 24, that is less than $\Delta n1$. As shown in FIG. 2, the preferred refractive index difference $\Delta n2$ for first glass layer 14 has a constant value of about 0, which corresponds to a layer of pure $SiO_2$ glass. However, the refractive index difference $\Delta n2$ of first glass layer may differ from zero, due to the presence of refractive index modifying dopants, provided that the dopant content of first glass layer 14 is low. It is envisaged that the refractive index difference varies across first glass layer. In any case, refractive-index-modifying dopants from inner core 12 or from second glass layer 16 may diffuse into first glass layer 14 during fiber fabrication.

Applicants have determined that, in order to achieve the above described advantages in combination with a relatively high field intensity in first glass layer 14, e.g., in terms of fiber low loss and low non-linearity, a low-dopant content in first glass layer 14 corresponds to a dopant content such as to cause a refractive index difference $\Delta n2$ for first glass layer 14 (in absolute value) of about, or preferably lower than, 15% of the fiber peak refractive index difference, i.e. of the refractive index difference $\Delta n3$ of second glass layer 16. The skilled in the art can adapt this value so that the resulting optical fiber has non-linear and/or loss characteristics matching the characteristics of an optical system that he/she intends to make, such as length of the optical transmission line, amplifier number and spacing and/or power, number and wavelength spacing of the transmission signals.

According to a preferred embodiment, improved fiber characteristics can be achieved by a dopant concentration in first glass layer 14 such as to cause a refractive index difference $\Delta n2$ that is lower in absolute value than 10% of refractive index difference $\Delta n3$ of second glass layer 16. This low dopant content in first glass layer, in combination with a relatively high field intensity in that region, gives a very limited contribution to the fiber non-linearity coefficient and loss.

Still more preferred fiber characteristics can be achieved by a refractive index difference $\Delta n2$ lower, in absolute value, than 5% of refractive index difference $\Delta n3$ of second glass layer 16.

First glass layer 14 has an outer radius r2 which, as shown in FIG. 2, is between about 9.0 µm and 12.0 µm, but preferably is 9.2 µm. As a result, first glass layer 14 has a width extending from about 4.8 µm to about 8.4 µm for a first embodiment of the present invention.

Second glass layer 16, like inner core 12, has its refractive index difference increased by doping the width of the glass layer with $GeO_2$ and/or other well-known dopants. Second glass layer 16 has a substantially parabolic profile across its radius that culminates in a maximum refractive index difference $\Delta n3$, depicted as 22 in FIG. 2, that exceeds the maximum refractive index difference $\Delta n1$ of glass core 12 and refractive index difference $\Delta n2$ of first layer 14. Index profiles other than parabolic, e.g., rounded or step like, are also envisaged for second glass layer 16.

Preferably the index of refraction $\Delta n3$ of second glass layer 16 at its peak exceeds the peak index of refraction $\Delta n1$ for inner core 12 by more than 5%. The index of refraction Δn3 of second glass layer 16 at its peak is about 0.009 to 0.012, but preferably is about 0.0115. Second glass layer 16 has a width w that equals about 0.6 μm to 1.0 μm, but preferably is about 0.9 μm.

Cladding 18 of optical fiber 10 has a refractive index profile 26 that has a refractive index difference substantially equal to 0. As mentioned, cladding 26 preferably is pure $SiO_2$ glass but may include dopants that do not raise its index of refraction above that of the maximum indices of refraction 20 and 22 of inner core 12 and second layer 16.

Applicants have found that optical transmission fiber 10 with the refractive index profile of FIG. 2 has several desirable optical characteristics for use in WDM transmission. Preferably, optical transmission fiber 10 is used in a transmission system that operates over a wavelength range of 1530 nm to 1565 nm where the fiber provides a total dispersion of 5 to 10 ps/nm/km across that operating wavelength range. More particularly, fiber 10 exhibits in the above wavelength range the following optical characteristics, with the characteristics of the most preferred embodiment in parentheses:

Dispersion=5–10 ps/nm/km (5.65 ps/nm/km @1550 nm)

Dispersion Slope @1550 nm≦0.06 ps/nm$^2$/km (0.056 ps/nm$^2$/km)

Macrobending Attenuation Coefficient @1550 nm<1 dB/km

Effective Area>45 μm$^2$

γ<2 W$^{-1}$ km$^{-1}$ (1.4 W$^{-1}$ km$^{-1}$ @1550 nm)

$\lambda_{cutoff}$<1480 nm (fiber cutoff wavelength according to ITU.T G.650)

These optical characteristics satisfy desired qualities for a transmission fiber for WDM systems both of soliton and non-soliton type.

As mentioned, the non-linearity coefficient γ provides an indication of the susceptibility of a fiber to non-linear effects. With γ of less than 2 W$^{-1}$ km$^{-1}$, fiber 10 exhibits favorable response in high power optical transmission systems that may otherwise initiate severe problems from self-phase modulation, cross-phase modulation, and the like. As well, fiber 10 includes a nonzero dispersion value across the operating range of 1530 nm to 1565 nm, which helps to deter detrimental four-wave mixing. Moreover, the relatively small slope of total dispersion across the operating wavelength range enables fiber 10 to provide relatively small differences of dispersion between carrier wavelengths in a WDM system.

FIGS. 3–6 more fully illustrate the relationships between the physical and optical characteristics of fiber 10. These figures present results from computer simulations for fiber 10 for various physical and optical relationships when considering six parameters: radius r1 of inner core 12, maximum index of refraction Δn1 of inner core 12, profile shape α for inner core 12, outer radius r2 of first layer 14, width w of second layer 16, and maximum index of refraction Δn3 of second layer 16. In the simulations represented by each of the graphs of FIGS. 3–6, these six parameters were varied essentially at random substantially across the ranges for the six parameters outlined above, i.e. r1 of 3.6–4.2 μm, Δn1 of 0.0082–0.0095, α of 1.7–2.0, r2 of 9.0–12.0 μm, w of 0.6–1.0 μm, and Δn3 of 0.009–0.012. Each dot represents a different set of the six parameters. The simulation considered only parameter sets having Δn1<Δn3. Accordingly, all dots correspond to fibers having an outer refractive index peak higher than the inner peak.

As shown in the simulation results of FIGS. 3–6, to achieve an optical fiber having a low non-linearity factor, the area of the refractive index profile for inner core 12 should be lowered. An outer ring of increased refractive index, specifically second glass layer 16, is added to help obtain a high effective area and a low non-linearity coefficient for fiber 10. In particular, Applicants have found that the addition of the second glass layer of increased index of refraction heightens the electrical field distribution in the cross-section of the fiber in regions with low dopant content, lowering it at the center of the fiber, so that the non-linearity coefficient γ remains low.

Furthermore, Applicants have found that the addition of the second glass layer of increased index of refraction has low influence on overall fiber dispersion, and that fiber dispersion is essentially determined by the radial dimension r1 of refractive index profile of inner core 12.

Figure 3:
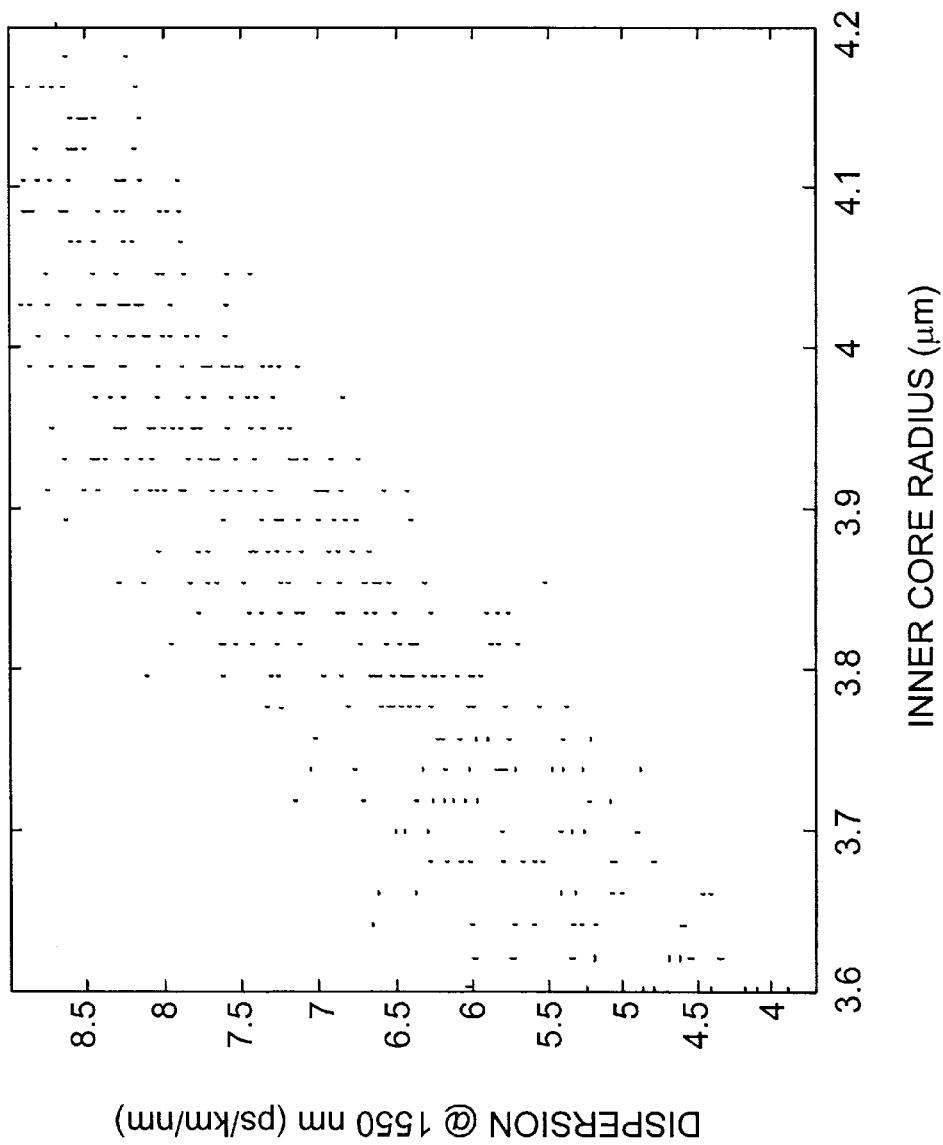
FIG. 3 is a graph of computer simulations of dispersion vs. inner-core radius for the first embodiment of the present invention.

FIG. 3 illustrates the relationship between the radius r1 and the dispersion for fiber 10. The value of r1 is preferably less than 3X, to achieve a monomodal behavior at a given wavelength λ. For a given range of dispersion, a proper range of radial dimension r1 for the refractive index profile may be determined.

Figure 4:
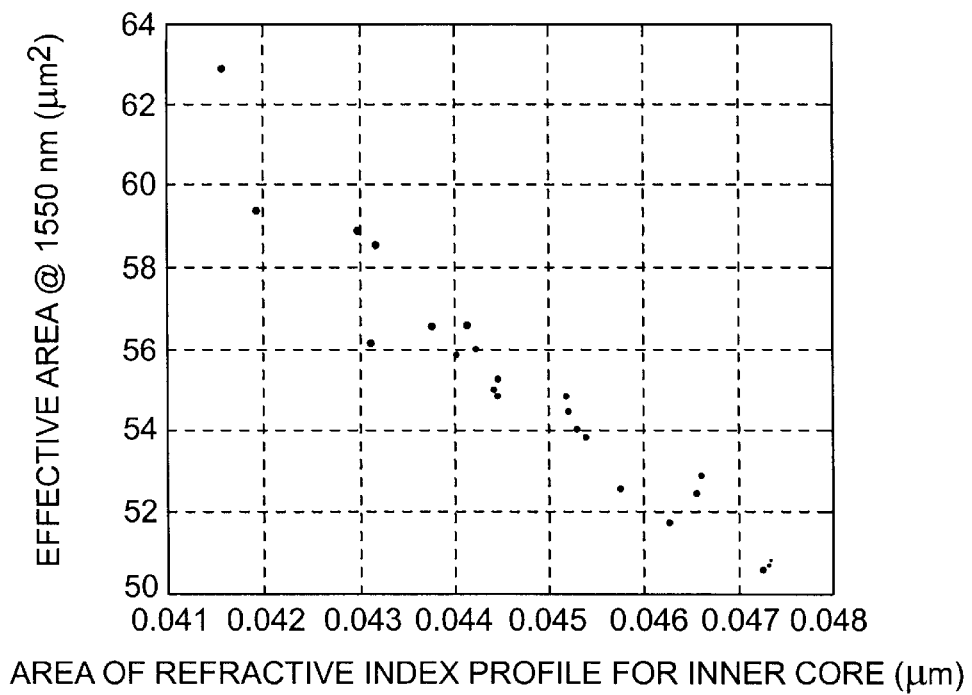
FIG. 4 is a graph of computer simulation of effective area vs. area of refractive index profile for inner core for the first embodiment of the present invention.
Figure 5:
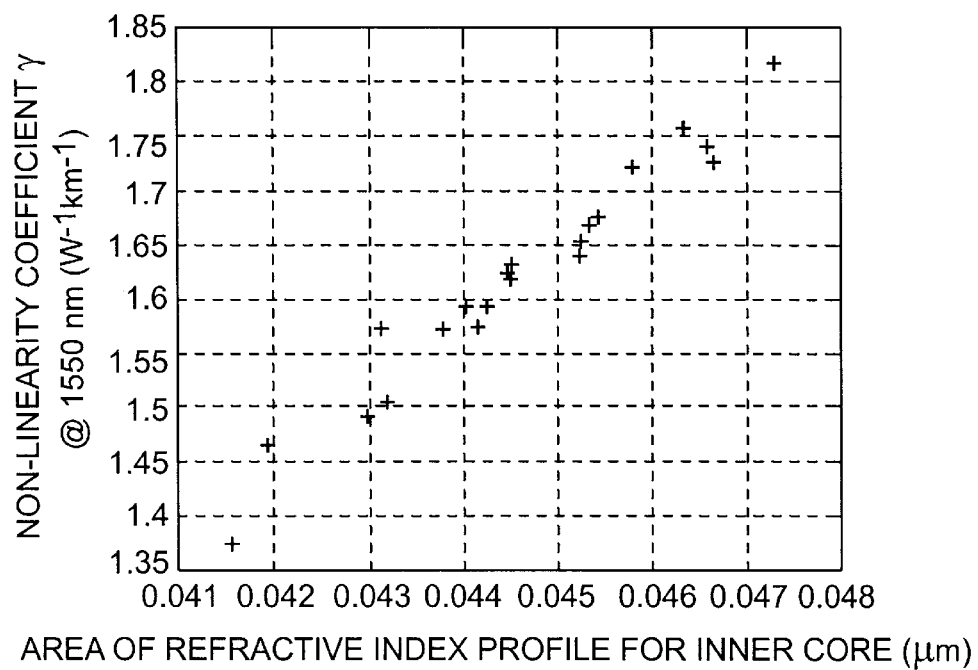
FIG. 5 is a graph of computer simulation of non-linearity coefficient γ vs. inner peak area for the first embodiment of the present invention.
Figure 6:
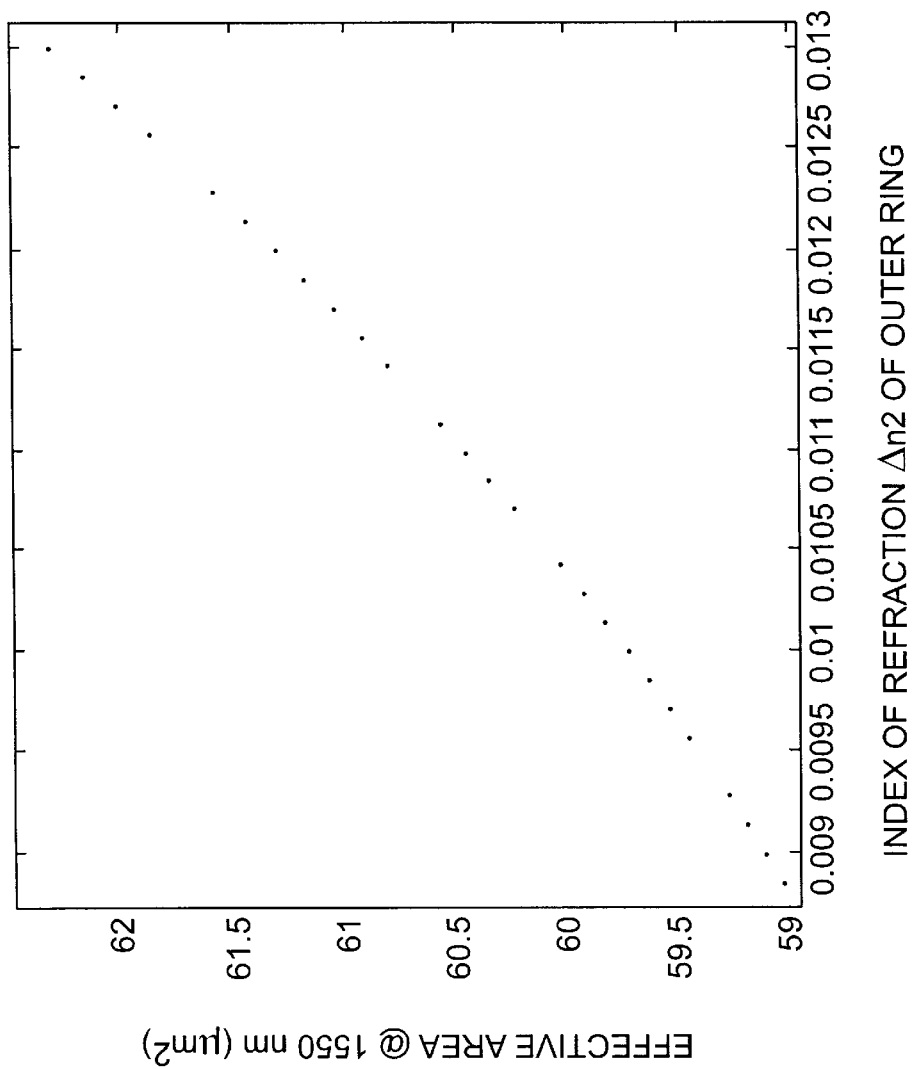
FIG. 6 is a graph of computer simulations of effective area vs. index of refraction for the second glass layer for the first embodiment of the present invention.

For deterring non-linear effects and enabling larger power the effective area of fiber 10 should be kept relatively high, preferably in excess of 45 μm$^2$. It is possible to lower the non-linearity coefficient in two ways: either reducing the area of the refractive index profile for the inner core (i.e., the area of the region between peak 20 and the co-ordinate axes in FIG. 2) (FIGS. 4–5), or increasing the refractive index of the second outer peak (FIG. 6). FIGS. 4 and 5 show the former effect for a series of computer simulations. For the sake of clarity, the radial dimension r1 in the simulations was kept constant, and so dispersion is essentially determined, in these figures. In order to reduce the area of the refractive index profile for the inner core, it is useful to reduce the refractive index difference Δn1 for a given radial dimension r1. An increase in effective area as the refractive index Δn1 is lowered occurs as shown in FIG. 4 because electric field confinement in inner core 12 becomes weaker.

Because a decrease in the area of the refractive index profile for the inner core leads to an increased effective area for the fiber, the decrease in area also provides a lower non-linearity coefficient γ, as shown in FIG. 5. Thus, the fiber 10 with a lower non-linearity coefficient γ can handle increased power and/or have decreased non-linear effects.

As well, Applicants have recognized that the addition of a lateral area of higher index of refraction positioned radially outward from the inner core will help to obtain a relatively large effective area and therefore low non-linearity coefficient γ. The addition of this lateral peak refractive index zone helps to make the electrical field distribution larger but does not substantially affect dispersion.

The radial position of second layer 16, its width, and its peak index of refraction all affect the overall effective area of the fiber. For example, FIG. 6 shows results of a computer simulation comparing effective area and the peak index of refraction difference for second layer 16, where other fiber parameters are kept constant for the sake of clarity. As is evident from FIG. 6, an increasing index of refraction difference for the outer ring 16 generates an increasing effective area for fiber 10.

Figure 7:
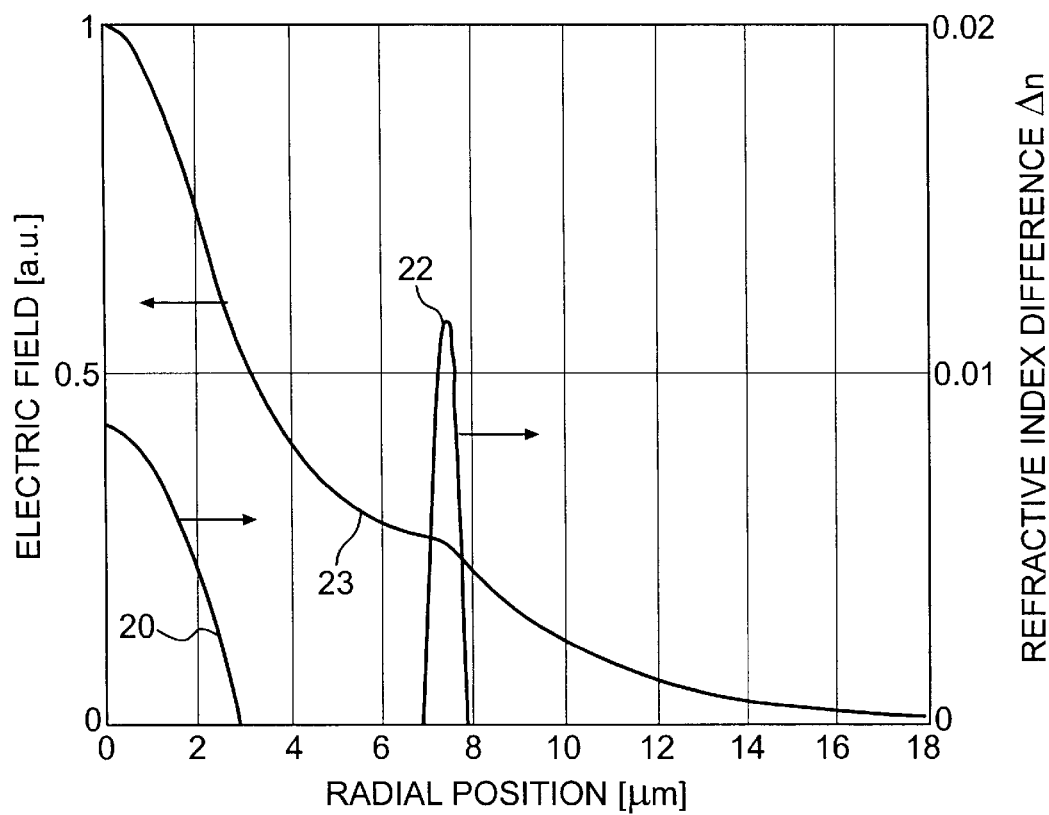
FIG. 7 is a graph of computer simulation of electric field vs. optical fiber radius for the first embodiment of the present invention.

FIG. 7 illustrates the spread of electric field within the cross-section of fiber 10 due to the addition of outer ring 16. In FIG. 7, references 20 and 22 denote an inner core and an outer ring, respectively, while reference 23 denotes the electrical field distribution across the fiber radius. The presence of the outer peak enlarges the electric field distribution in the fiber.

Figure 8A:
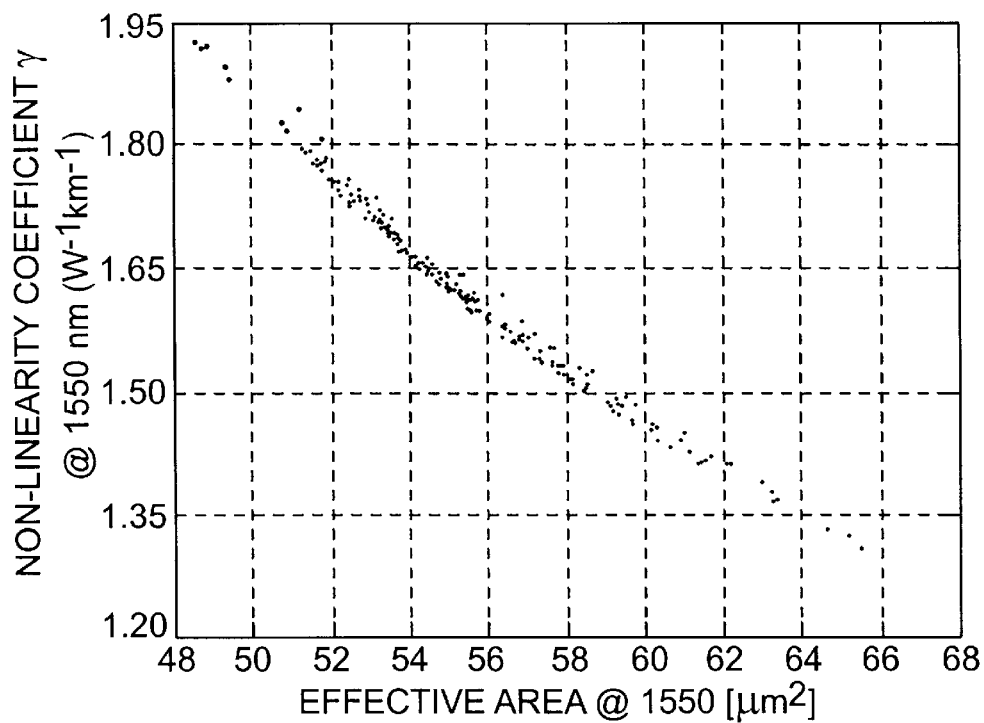
FIG. 8A is a graph of computer simulations of non-linearity coefficient vs. effective area for the first embodiment of the present invention.
Figure 8B:
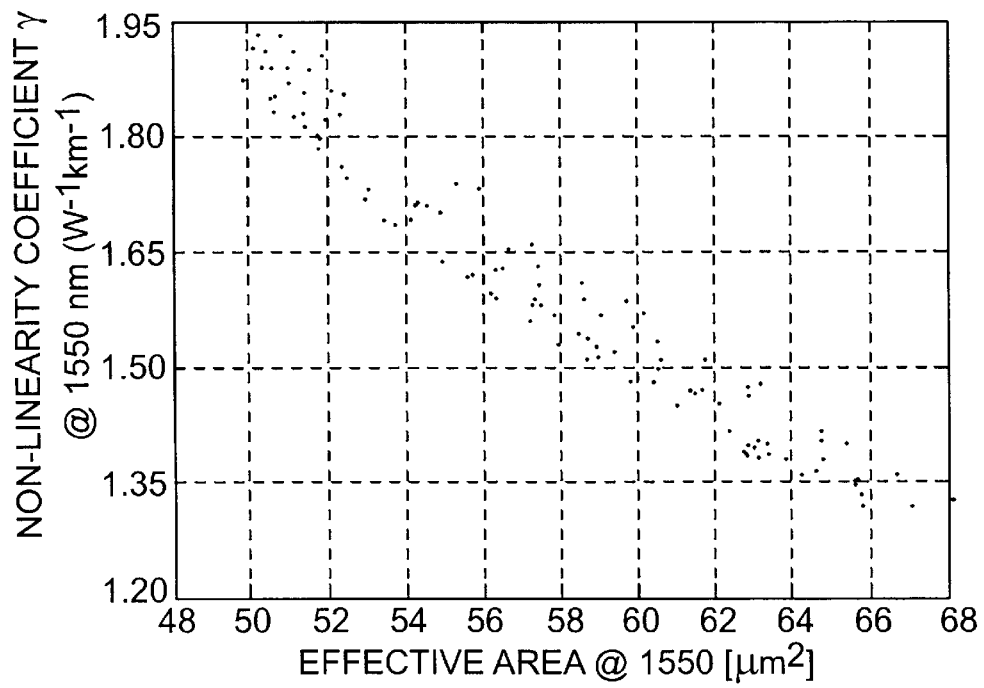
FIG. 8B is a graph of computer simulations of non-linearity coefficient vs. effective area for conventional dual-shape dispersion-shifted optical fibers.

Applicants have also determined that optical fibers having a maximum refractive index region in an outer ring of the core as in the profile of FIG. 2 exhibit a low $A_{eff}\cdot\gamma$ product, i.e., a lower $\gamma$ in comparison with other fibers having the same effective area. For example, FIG. 8A illustrates the simulated relationship between $\gamma$ and effective area for fibers 10 according to the first embodiment. In contrast, FIG. 8B illustrates the simulated relationship between $\gamma$ and effective area for conventional dual-shape dispersion-shifted optical fibers, which exhibit a less desirable (i.e., a higher) $A_{eff}\cdot\gamma$ product.

In short, fiber 10 provides an optical waveguide with a unique refractive index profile for transmitting optical WDM signal with nonzero dispersion and a relatively low non linearity coefficient. These features enable fiber 10 to minimize signal degradation due to four-wave mixing and/or to permit the use of higher power.

Figure 9:
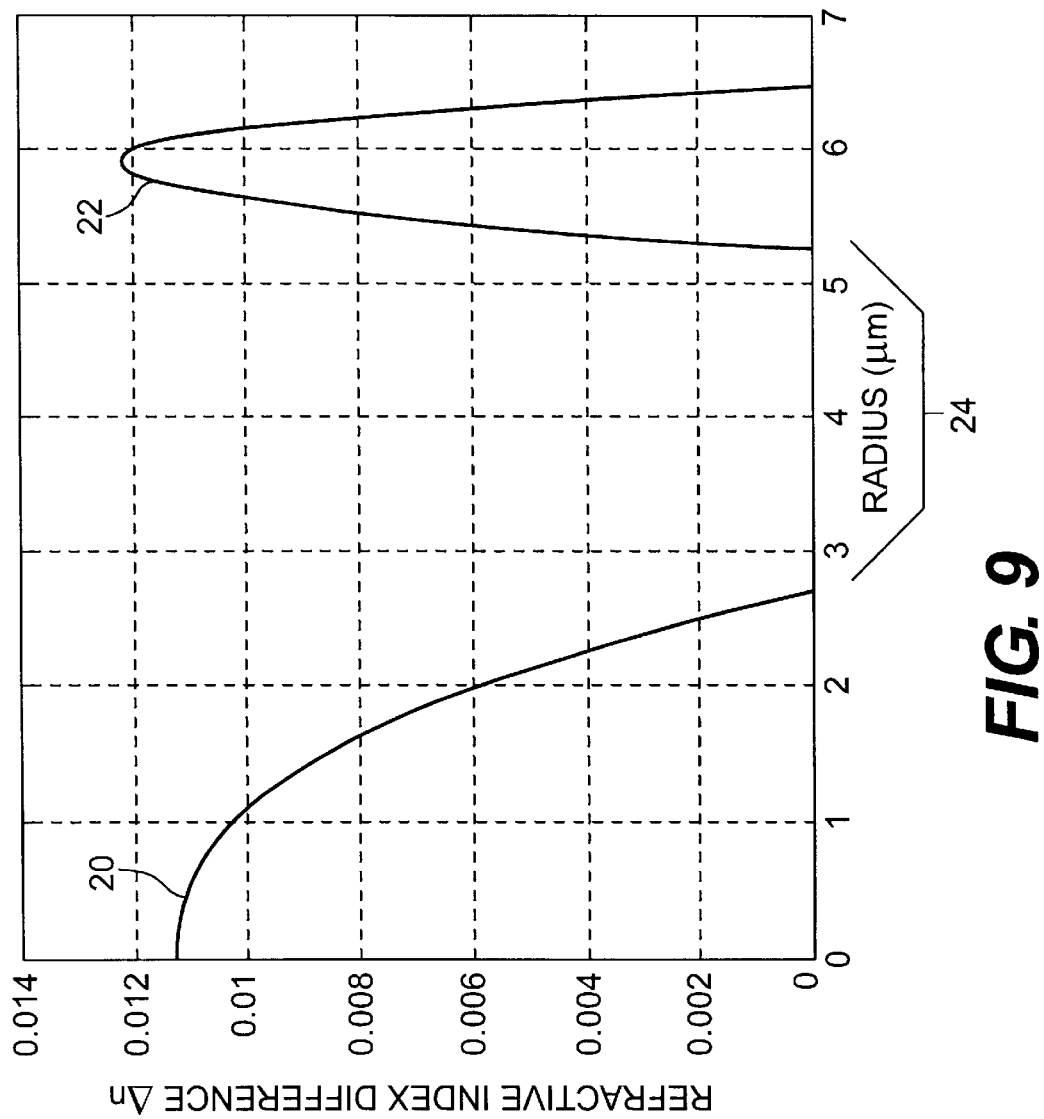
FIG. 9 is a graph of the refractive index profile of the cross-section of the fiber in FIG. 1 consistent with a second embodiment of the present invention.

FIG. 9 illustrates a second embodiment of the present invention for optical fiber 10 of FIG. 1. In this second embodiment, inner core 12 has a radius r1 that is about 2.3 μm to 3.6 μm, but preferably is about 2.77 μm. Between the center of the fiber and the radial position at 2.77 μm, inner core 12 includes one or more refractive-index-increasing dopants, such as $GeO_2$ or the like, that produce a peak index of refraction at or near the axial center of fiber 10 and a minimum for the inner core at its outer radius. At the peak, the index of refraction Δn1 for inner core 12 in the second embodiment is about 0.010 to about 0.012, and preferably is about 0.0113. As with the first embodiment, the concentration of the refractive-index-modifying dopant in the core 12 decreases from the center to the outer radius at about 2.77 μm in a manner to produce a profile having a profile α of about 1.4 to about 3.0, but preferably of about 2.42. First glass layer 14 in the second embodiment has a substantially constant refractive index difference Δn2, referenced as 24, that is about 0, due to undoped silica glass. However, as previously explained with reference to the first embodiment of FIG. 2, low dopant concentrations can be present in first glass layer 14. The first layer 14 extends to an outer radius r2 equal to between about 4.4 μm and 6.1 μm, but preferably equal to 5.26 μm. As a result, first glass layer 14 has a width extending from about 0.8 μm to about 3.8 μm, but preferably of about 2.49 μm, for a second embodiment of the present invention.

As with the first embodiment, the second embodiment includes a second glass layer 16, like inner core 12, with its refractive index difference increased by doping the width of the glass layer with $GeO_2$ and/or other well-known refractive-index-increasing dopants. Second glass layer 16 has a substantially parabolic profile across its radius that culminates in a maximum refractive index difference Δn3, depicted as 22 in FIG. 9. Index profiles other than parabolic, e.g., rounded or step like, are also envisaged for second glass layer 16.

Preferably the index of refraction Δn3 of second glass layer 16 at its peak exceeds the peak index of refraction Δn1 for inner core 12 by more than 5%. The index of refraction Δn3 of second glass layer 16 at its peak is about 0.012 to 0.014, but preferably is about 0.0122.

Second glass layer 16 has a width w that equals about 1.00 μm to about 1.26 μm, but preferably is about 1.24 μm.

Preferably, optical transmission fiber 10 is used in a transmission system that operates over a wavelength range of 1530 nm to 1565 nm where the fiber provides positive nonzero dispersion characteristics. Nonzero dispersion fibers are described in ITU-T Recommendation G.655.

Fiber 10 constructed according to the second embodiment of FIG. 9 exhibits the following preferred optical characteristics (the values are given for a value of 1550 nm, unless otherwise indicated):

Chromatic Dispersion @1530 nm≧0.5 ps/nm/km 0.07 ps/nm²/km≦Dispersion Slope≦0.11 ps/nm²/km 45 μm²≦$A_{eff}$≦100 μm²

1 $W^{-1}$ $km^{-1}$≦γ≦2 $W^{-1}$ $km^{-1}$

Macrobending Attenuation Coefficient≦0.01 dB/km (fiber loosely wound in 100 turns with a bend radius of 30 mm)

Microbending Sensitivity≦10 (dB/km)/(g/mm)

$\lambda_{cutoff}$≦1600 nm (fiber cutoff wavelength according to ITU.T G.650)

The second embodiment for fiber 10 having the above-listed optical characteristics provides acceptable conditions for the transmission of both solitons and non-soliton WDM systems.

Figure 10:
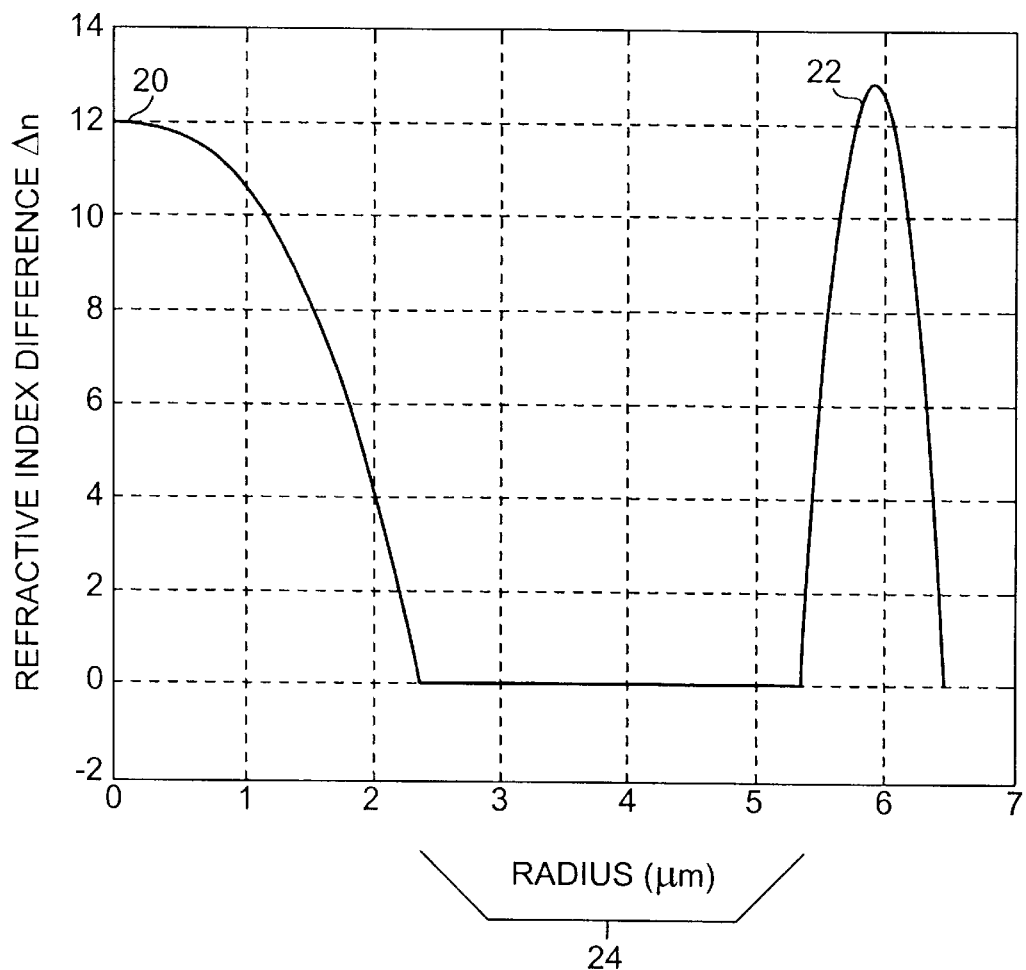
FIG. 10 is a graph of the refractive index profile of the cross-section of the fiber in FIG. 1 consistent with a third embodiment of the present invention.

FIG. 10 depicts a refractive index profile of a third embodiment of the present invention for optical fiber 10, whose cross-section is shown in FIG. 1. The third embodiment, like the first and second embodiments, includes an inner core with a heightened refractive index difference Δn1 and a profile shape α, together with a first layer of glass having a lower refractive index difference Δn2 and a second layer of glass having the maximum index of refraction difference Δn3 in the cross-section of the fiber. The following sets forth the preferred physical parameters for fiber 10 according to the third embodiment of the present invention as illustrated in FIG. 10.

Inner Core Radius r1=2.387 μm

Inner Core Refractive Index Difference Δn1=0.0120

First Layer Radius r2=5.355 μm

First Layer Refractive Index Difference Δn2=0.0

Second Layer Width w=1.129 μm

Second Layer Refractive Index Difference Δn3=0.0129.

Of course, variations from these optimal structural values do not alter their general inventive features. Fiber 10 according to the third embodiment of the present invention advantageously obtains the following optimal optical characteristics (at a wavelength of 1550 nm):

Dispersion=3.4 ps/nm/km

Dispersion Slope=0.11 ps/nm²/km

Mode Field Diameter=9.95 μm

Effective Area=90 μm²

γ=1.00 $W^{-1}$ $km^{-1}$.

The third embodiment for fiber 10 having the above-listed optical characteristics provides acceptable conditions for the transmission in both solitons and non-soliton WDM systems.

Figure 11:
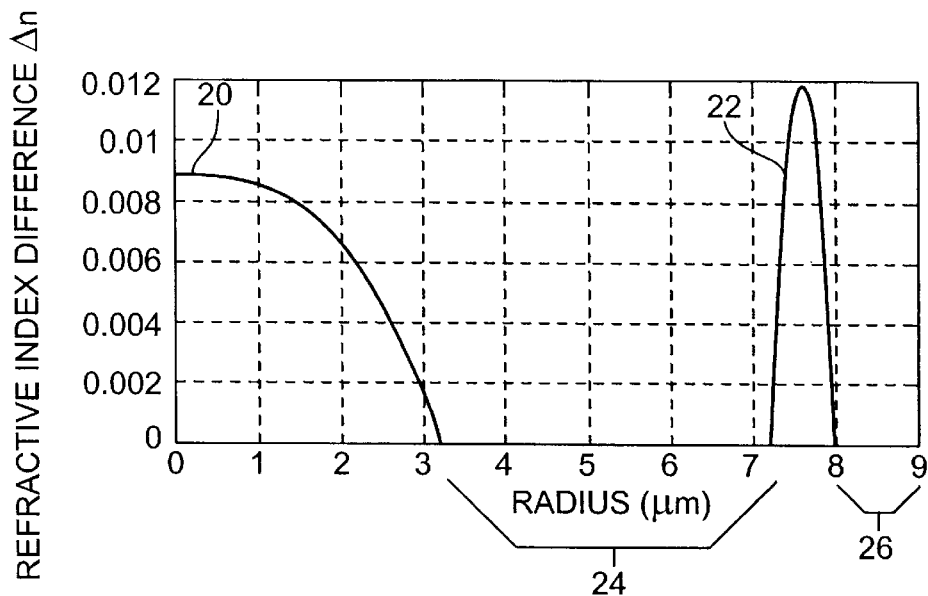
FIG. 11 is a refractive index profile of the optical fiber in FIG. 1 consistent with a fourth embodiment of the present invention.

FIG. 11 illustrates a fourth refractive index profile for optical fiber 10 that generates optical characteristics of nonzero positive dispersion. The physical characteristics of the inventive fiber of FIG. 11 include a radius r1 for inner core 12 of about 3.2 μm, an index of refraction profile α for inner core 12 of about 2.9, a maximum refractive index difference Δn1 at reference 20 for inner core 12 of about 0.0088, an outer radius of first glass layer 14 of about 7.2 μm with an index of refraction Δn2 at reference 24 of about 0, a width of second glass layer 16 of about 0.8 μm, and a maximum index of refraction Δn3 at reference 22 of the second glass layer 16 of about 0.0119. As with the refractive index profile of FIG. 2, the profile of FIG. 11 for the nonzero positive dispersion fiber has the characteristic multiple peaks high refractive index, where the outer peak is present in the second glass layer 16, has a substantially parabolic shape, and at its maximum 22 exceeds the maximum index of refraction 20 within inner core 12.

Figure 12:
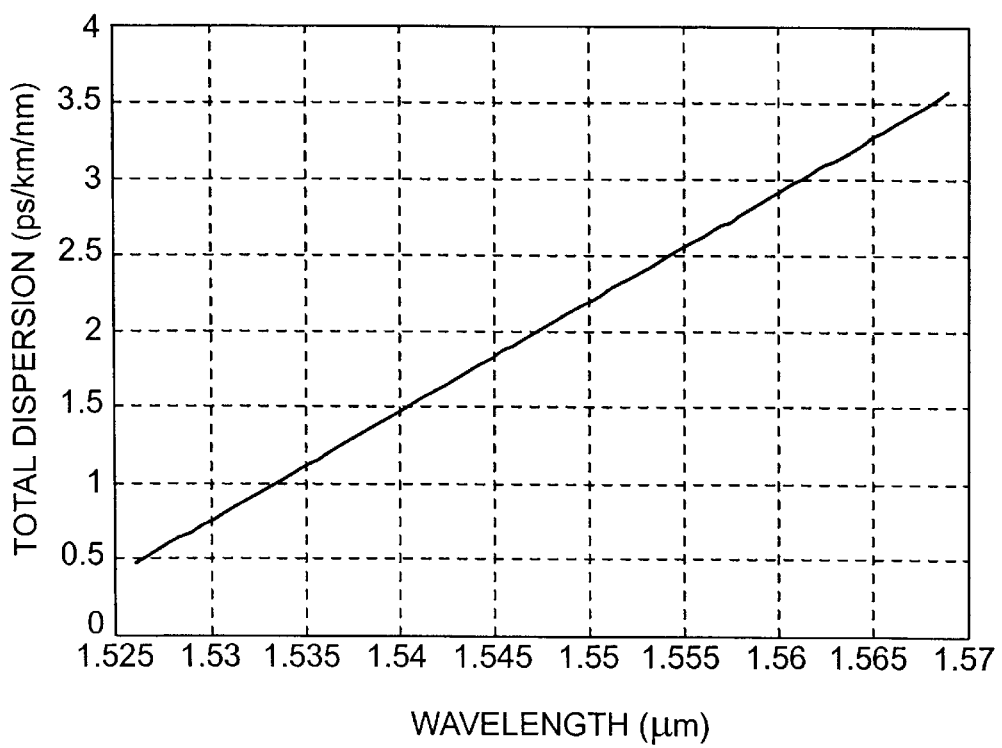
FIG. 12 is a graph of total dispersion vs. wavelength for a fiber according to the fourth embodiment of the present invention.

Fiber 10 having the refractive index profile of FIG. 11 provides positive total fiber dispersion across the operating wavelength band of 1530 nm to 1565 nm. Such a performance has desirable application in optical systems that have a relatively high optical power and would otherwise generate deleterious four-wave mixing products. FIG. 12 depicts the simulated total dispersion vs. wavelength for optical fiber 10 having the refractive index profile of FIG. 11. As shown in this figure, the refractive index profile of FIG. 11 produces dispersion across the wavelength band of about 1530 nm to 1565 nm that stretches between about 0.76 ps/km/nm and 3.28 ps/km/nm. Specifically, the fiber with the refractive index profile shown in FIG. 11 provides the following optical characteristics at 1550 nm:

Dispersion=2.18 ps/nm/km

Dispersion Slope=0.072 ps/nm$^2$/km

Macrobending Attenuation Coefficient=0.01 dB/km

Mode Field Diameter=9.0 µm

Effective Area=62 µm$^2$ $\gamma$=1.8 W$^{-1}$ km$^{-1}$.

All of these characteristics fall within the ranges stated by ITU-T G.655 Recommendation for nonzero dispersion fibers.

Figure 13:
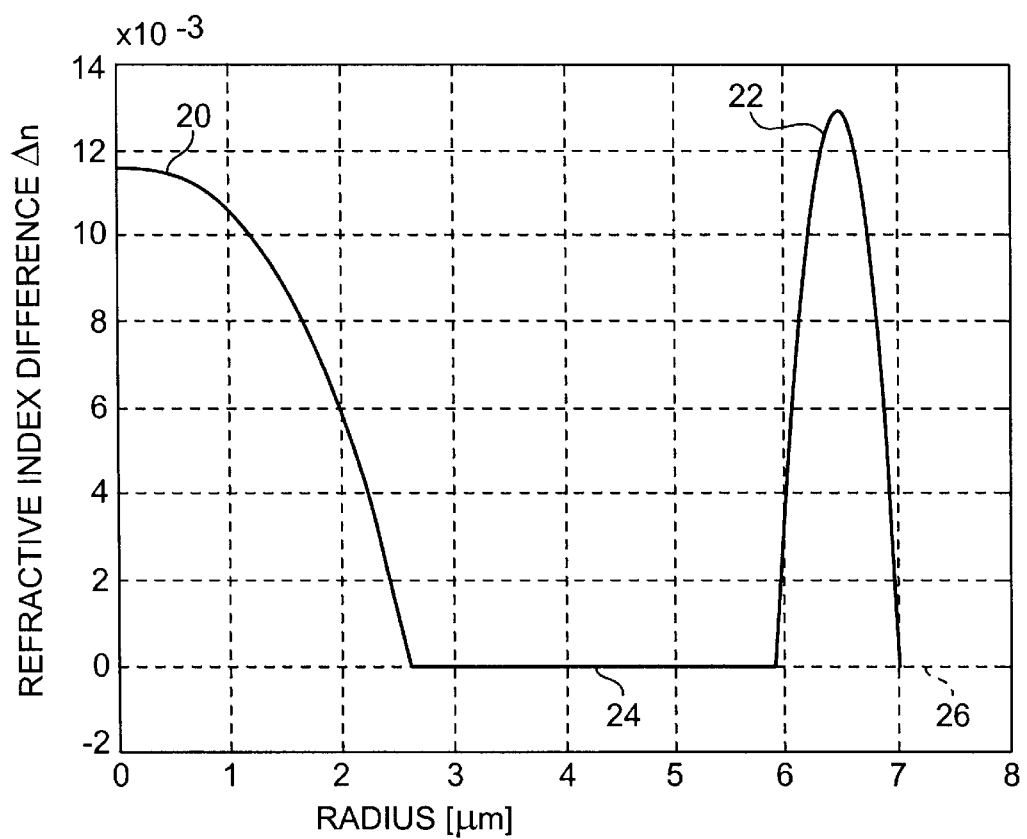
FIG. 13 is a refractive index profile of the fiber in FIG. 1 consistent with a fifth embodiment of the present invention.

FIG. 13 illustrates a fifth refractive index profile for optical fiber 10 that generates optical characteristics of nonzero negative dispersion with relatively low non-linearity coefficient. The physical characteristics of the inventive fiber of FIG. 13 include a radius r1 for inner core 12 of about 2.4 µm to 3.2 µm and preferably of about 2.6 µm, an index of refraction profile $\alpha$ for inner core 12 of about 1.8 to 3.0 and preferably of about 2.48, a maximum refractive index difference $\Delta$n1 at reference 20 for inner core 12 of about 0.0106–0.0120 and preferably of about 0.0116, an outer radius of first glass layer 14 of about 5.3 µm to 6.3 µm and preferably of about 5.9 µm with an index of refraction $\Delta$n2 at reference 24 preferably of about 0, a width of second glass layer 16 of about 1.00 µm to 1.08 µm and preferably of about 1.08 µm, and a maximum index of refraction $\Delta$n3 at reference 22 of the second glass layer 16 of about 0.0120 to 0.0132 and preferably of about 0.0129. As previously explained, low dopant concentrations can be present in first glass layer 14. As with the refractive index profile of FIGS. 2, 9, 10, and 11, the profile of FIG. 13 for the nonzero negative dispersion fiber has the characteristic multiple peaks of high refractive index, where the outer peak is present in the second glass layer 16, has a substantially parabolic shape, and at its maximum 22 exceeds the maximum index of refraction 20 within inner core 12. Index profiles other than parabolic, e.g., rounded or step like, are also envisaged for second glass layer 16. Preferably the index of refraction $\Delta$n3 of second glass layer 16 at its peak exceeds the peak index of refraction $\Delta$n1 for inner core 12 by more than 5%.

Fiber 10 having the refractive index profile of FIG. 13 provides negative total fiber dispersion across the operating wavelength band of 1530 nm to 1565 nm. Such a performance has desirable application in optical systems used in underwater transmission systems that have a relatively high optical power and would otherwise generate deleterious four-wave mixing products. Specifically, the fiber with the refractive index profile shown in FIG. 13 provides the following optical characteristics at 1550 nm, with the characteristics of the most preferred embodiment in parentheses:

Dispersion$\leq$–0.5 ps/nm/km (–2.46 ps/nm/km)

0.07 ps/nm$^2$/km$\leq$Dispersion Slope$\leq$0.12 ps/nm$^2$/km (0.11 ps/nm$^2$/km)

Macrobending Attenuation Coefficient$\leq$0.01 dB/km (0.0004 dB/km)

Mode Field Diameter=9.1 µm

45 µm$^2$$\leq$Effective Area$\leq$75 µm$^2$ (68 µm$^2$)

1.2 W$^{-1}$ km$^{-1}$$\leq$$\gamma$$\leq$2 W$^{-1}$ km$^{-1}$ (1.3 W$^{-1}$ km$^{-1}$)

$\lambda_{cutoff}$$\leq$1600 nm (fiber cutoff wavelength according to ITU.T G.650)

A sixth refractive index profile for optical fiber 10 will now be described that generates optical characteristics of shifted dispersion with relatively low non-linearity coefficient. Dispersion shifted fibers are described in ITU-T Recommendation G.653. The physical characteristics of the fiber according to the sixth embodiment include a radius r1 for inner core 12 of about 3.2 µm, an index of refraction profile $\alpha$ for inner core 12 of about 2.8, a maximum refractive index difference $\Delta$n1 at reference 20 for inner core 12 of about 0.0092, an outer radius of first glass layer 14 of about 7.8 µm with an index of refraction $\Delta$n2 of about 0, a width of second glass layer 16 of about 0.8 µm, and a maximum index of refraction $\Delta$n3 of the second glass layer 16 of about 0.0118. As with the refractive index profile of FIGS. 2, 9, 10, 11 and 13 the profile according to the sixth embodiment for the dispersion shifted fiber has the characteristic multiple peaks of high refractive index, where the outer peak is present in the second glass layer 16, has a substantially parabolic shape, and at its maximum 22 exceeds the maximum index of refraction 20 within inner core 12. Index profiles other than parabolic, e.g., rounded or step like, are also envisaged for second glass layer 16. Preferably the index of refraction $\Delta$n3 of second glass layer 16 at its peak exceeds the peak index of refraction $\Delta$n1 for inner core 12 by more than 5%.

Fiber 10 having the refractive index profile of FIG. 13 provides low absolute value total fiber dispersion across the operating wavelength band of 1530 nm to 1565 nm.

Specifically, the fiber provides the following optical characteristics, given at 1550 nm unless otherwise indicated:

Dispersion=0.42 ps/nm/km

Dispersion Slope=0.066 ps/nm$^2$/km

Dispersion @1525 nm=–1.07 ps/nm/km

Dispersion @1575 nm=+2.22 ps/nm/km

Macrobending Attenuation Coefficient=0.6 dB/km

Mode Field Diameter=8.8 µm

Effective Area=58 µm$^2$ $\gamma$=1.56 W$^{-1}$ km$^{-1}$ $\lambda_{cutoff}$=1359 nm (fiber cutoff wavelength according to ITU.T G.650)

It will be apparent to those skilled in the art that various modifications and variations can be made to the system and method of the present invention without departing from the spirit or scope of the invention. For example, the refractive index profiles depicted in the figures are intended to be exemplary of preferred embodiments. The precise shape, radial distance, and refractive index differences may readily be fluctuated by one of ordinary skill in the art to obtain the equivalent fibers as disclosed herein without departing from the spirit or scope of this invention. Although fiber operation in a wavelength range of between 1530 nm and 1565 nm has been disclosed for the given embodiments, signals in different wavelength ranges can be transmitted in a fiber according to the invention, if specific wavelength requirements arise in present or future optical communication systems. In particular the skilled in the art may envisage use of the described fibers, or of straightforward modifications thereof, to operate in an extended wavelength range of between about 1520 nm and about 1620 nm, where silica keeps low attenuation properties.

The present invention covers the modifications and variations of this invention provided they come within the scope of the appended claims and their equivalents.

What is claimed is:

1. An optical transmission fiber with a low non-linearity coefficient γ and high effective area for use in an optical transmission system, comprising:
   a core region comprising:
      a glass inner core having a first maximum refractive index difference $\Delta n1$, a profile α, and a radius r1;
      a first glass layer radially surrounding the inner core, having a refractive index difference $\Delta n2$ less than $\Delta n1$, and having an outer radius r2; and
      a second glass layer radially surrounding the first layer, having a second maximum refractive index difference $\Delta n3$ greater than $\Delta n1$, and having a width w,
   and a low loss cladding surrounding said core region,
   wherein said non-linearity coefficient γ is less than about 2 $W^{-1}$ $km^{-1}$,
   characterized in that said refractive index difference $\Delta n2$ is lower in absolute value than 10% of said second maximum refractive index difference $\Delta n3$.

2. The optical transmission fiber of claim 1, wherein $\Delta n2$ is lower in absolute value than 5% of $\Delta n3$.

3. The optical transmission fiber of claim 2, wherein $\Delta n2$ is about 0.0.

4. The optical transmission fiber of claim 1, wherein the maximum refractive index difference $\Delta n3$ of second glass layer exceeds the maximum core refractive index difference $\Delta n1$ by more than 5%.

5. The optical transmission fiber of claim 1, wherein r1 is about 3.6 μm to 4.2 μm, r2 is about 9.0 μm to 12.0 μm, and w is about 0.6 μm to 1.0 μm.

6. The optical transmission fiber of claim 5, wherein α is about 1.7 to 2.0.

7. The optical transmission fiber of claim 5 or 6, wherein $\Delta n3$ is about 0.009 to 0.012.

8. The optical transmission fiber of claim 7, wherein $\Delta n1$ is about 0.0082 to 0.0095.

9. The optical transmission fiber of any one of claims 1, 5 or 6 wherein total dispersion for the fiber in a wavelength range of 1530 nm to 1565 nm is about 5 ps/nm/km to 10 ps/nm/km.

10. The optical transmission fiber of claim 1, wherein r1 is about 2.3 μm to 3.6 μm, r2 is about 4.4 μm to 6.1 μm, and w is about 1.00 μm to 1.26 μm.

11. The optical transmission fiber of claim 10, wherein α is about 1.4 to 3.0.

12. The optical transmission fiber of any one of claims 1, 10 or 11 wherein total dispersion for the fiber in a wavelength range of 1530 nm to 1565 nm is greater than about 0.5 ps/nm/km.

13. The optical transmission fiber of claim 10 or 8, wherein $\Delta n3$ is about 0.0120 to 0.0140.

14. The optical transmission fiber of claim 13, wherein $\Delta n1$ is about 0.0100 to 0.0120.

15. The optical transmission fiber of claim 13, wherein $\Delta n2$ is lower in absolute value than 5% of $\Delta n3$.

16. The optical transmission fiber of claim 1, wherein r1 is about 2.4 μm to 3.2 μm, r2 is about 5.3 μm to 6.3 μm, and w is about 1.00 μm to 1.08 μm.

17. The optical transmission fiber of claim 16, wherein α is about 1.8 to 3.0.

18. The optical transmission fiber of any one of claims 1, 16, or 17, wherein total dispersion for the fiber in a wavelength range of 1530 nm to 1565 nm is less than about −0.5 ps/nm/km.

19. The optical transmission fiber of claim 16 or 17, wherein $\Delta n3$ is about 0.0120 to 0.0132.

20. The optical transmission fiber of claim 19, wherein $\Delta n1$ is about 0.0106 to 0.0120, $\Delta n2$ is about 0.0.

21. The optical transmission fiber of claim 19, wherein $\Delta n2$ is lower in absolute value than 5% of $\Delta n3$.

22. An optical transmission system comprising an optical transmitter for outputting an optical signal and an optical transmission line for transmitting said signal,
   characterized in that the optical transmission line comprises an optical transmission fiber comprising a core region and a low loss cladding surrounding the core region, the core region having a first refractive index peak in the central cross-sectional area of the core region, an outside ring having a second refractive index peak higher than the first peak and a low-dopant-content region between the two peaks having a third refractive index lower in absolute value than 15% of the second refractive index peak.

23. An optical transmission system according to claim 22, wherein said low-dopant-content region has a refractive index difference, in absolute value, equal to or lower than 15% of the fiber peak refractive index difference.

24. An optical transmission system according to claim 22, further comprising:
   a plurality of optical transmitters for outputting a plurality of optical signals, each signal having a particular wavelength;
   an optical combiner for combining the optical signals to form a wavelength division multiplexed optical communication signal and outputting the combined signal onto said optical transmission line.

25. An optical transmission system according to claim 22, wherein said optical transmission fiber has a length greater than 50 km.

26. An optical transmission system according to claim 22, wherein said optical transmission line comprises an optical amplifier.

27. An optical transmission fiber with a high effective area and a non-linearity coefficient γ lower than about 2 $W^{-1}$ $km^{-1}$ for use in an optical transmission system, comprising:
   a core region comprising:
      a glass inner core having a first maximum refractive index difference $\Delta n1$, a profile α, and a radius r1;
      a first glass layer radially surrounding the inner core, having a refractive index difference $\Delta n2$ less than $\Delta n1$, and having an outer radius r2; and
      a second glass layer radially surrounding the first layer, having a second maximum refractive index difference $\Delta n3$ greater than $\Delta n1$, and having a width w,
   and a low loss cladding surrounding said core region,
   characterized in that said first glass layer comprises a low-dopant-content region.

28. A method for controlling non-linear effects in optical fiber transmission comprising the steps of:
   generating an optical signal;
   coupling the optical signal in a silica optical fiber having a non-linearity coefficient and a central cross-sectional area with a first refractive index peak;
   enhancing a field intensity associated with the optical signal in a fiber cross-sectional area outside said central cross-sectional area, the fiber having a doped annular glass ring with a second refractive index peak value, higher than the first peak, the annular glass ring being surrounded by a low loss cladding; and
   a fiber cross-sectional region between the two peaks with a refractive index lower in absolute value than 15% of the second refractive index peak so as to reduce the fiber non-linearity coefficient.

* * * * *